April 30, 1940.   G. SOLBRIG   2,198,925
VALVE AND SEAT REDRESSING TOOL
Filed Jan. 26, 1939   4 Sheets-Sheet 1
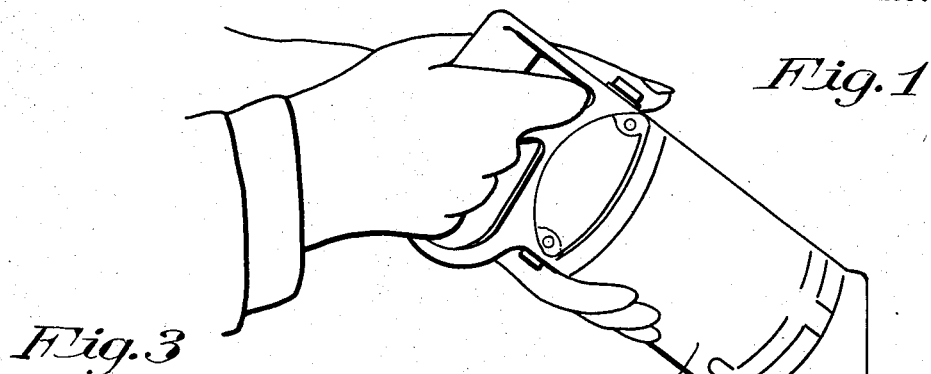
Fig. 1
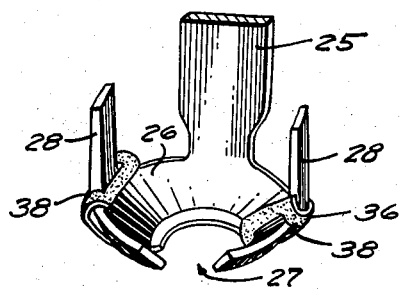
Fig. 3
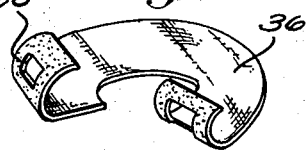
Fig. 4
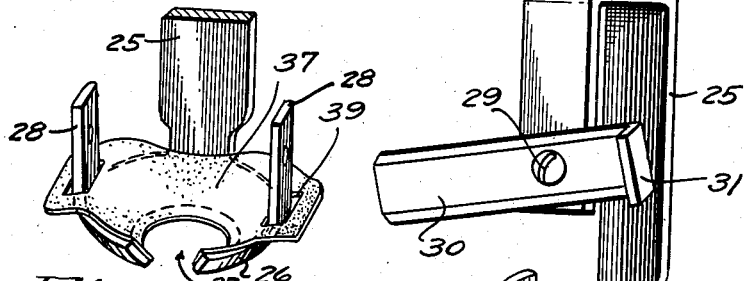
Fig. 5    Fig. 2
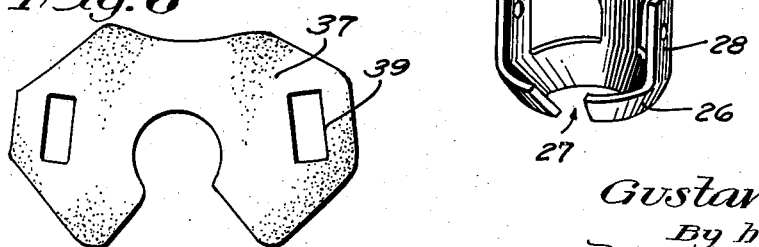
Fig. 6
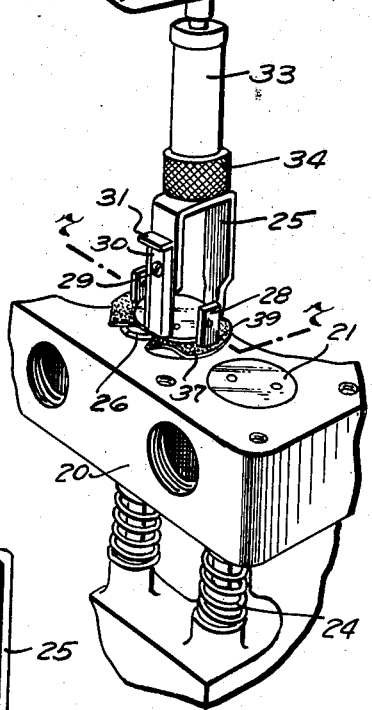
Inventor
Gustav Solbrig
By his Attorneys

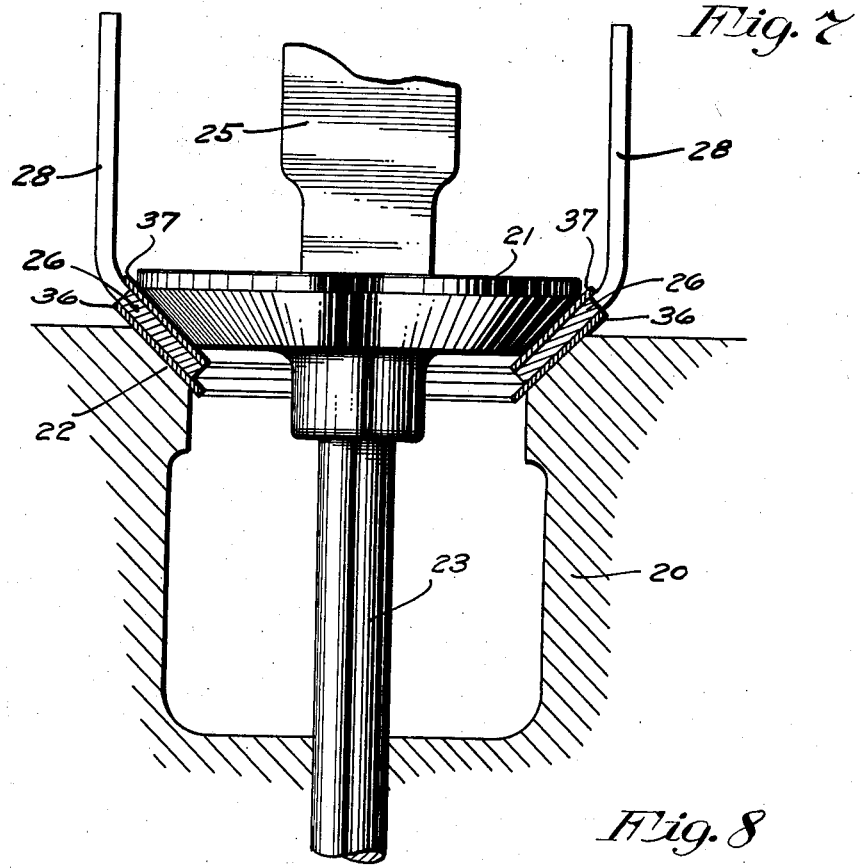
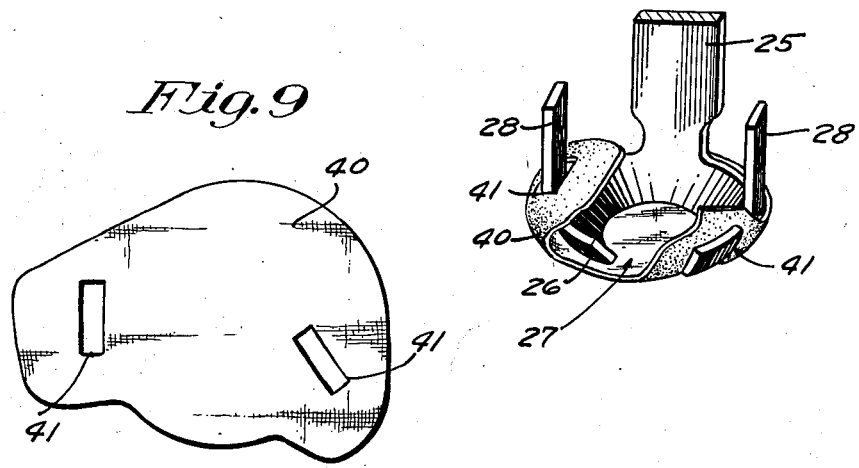

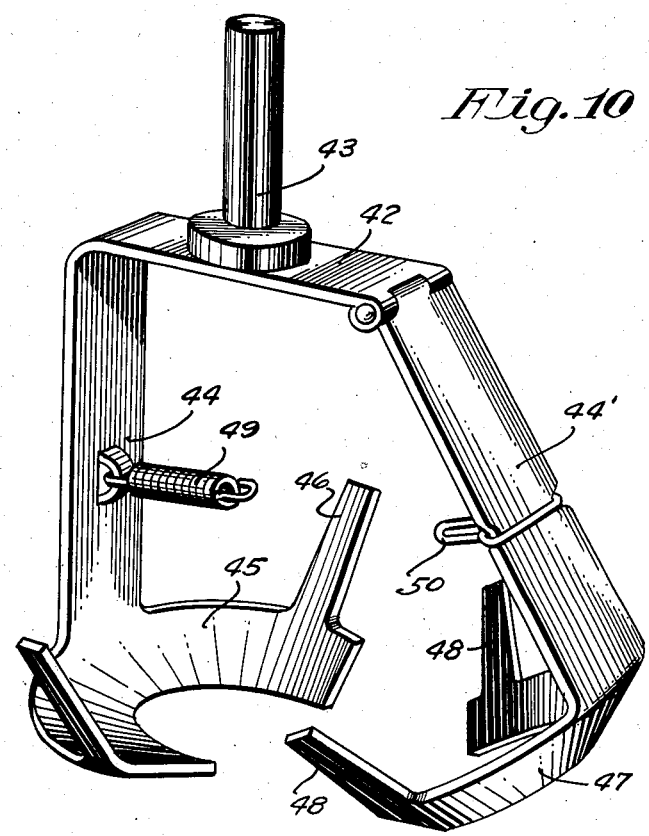
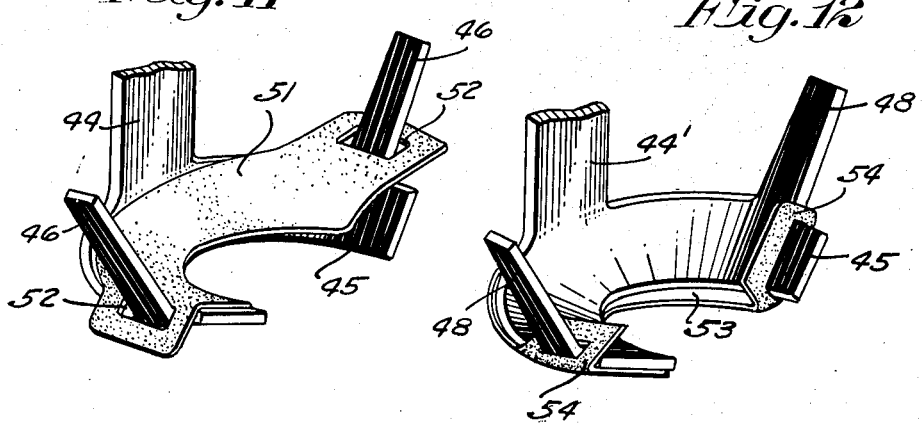

April 30, 1940.  G. SOLBRIG  2,198,925
VALVE AND SEAT REDRESSING TOOL
Filed Jan. 26, 1939  4 Sheets-Sheet 4
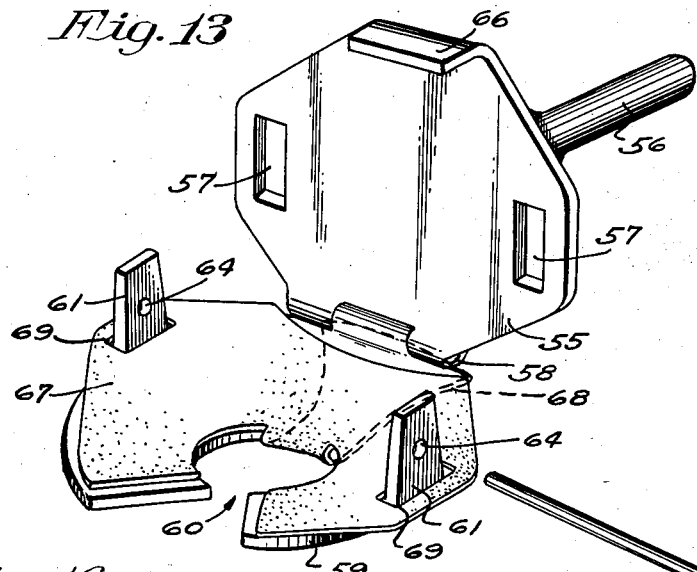
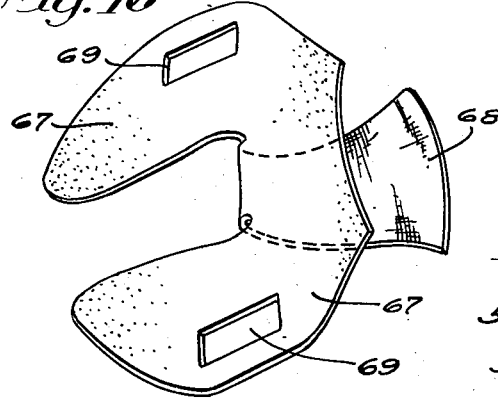
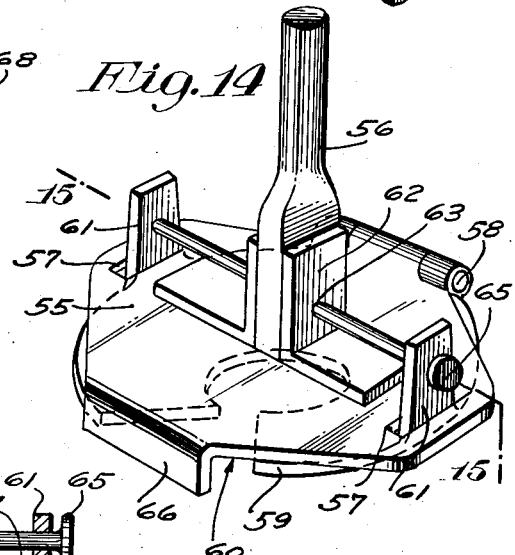
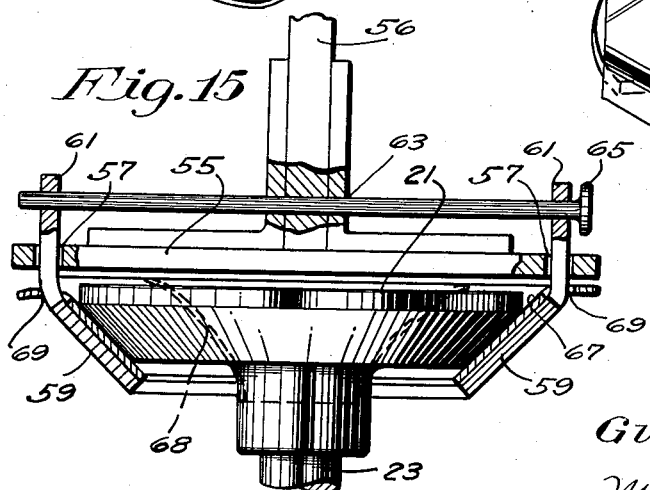
Inventor
Gustav Solbrig
By his Attorneys Patented Apr. 30, 1940

2,198,925

UNITED STATES PATENT OFFICE 2,198,925

VALVE AND SEAT REDRESSING TOOL

Gustav Solbrig, Cedar Rapids, Iowa, assignor of forty-eight per cent to William H. Dutton, Minneapolis, Minn.

Application January 26, 1939, Serial No. 252,895

13 Claims. (Cl. 51—185)

My invention relates to and provides an improved device for rapidly and at low cost refacing or dressing the valves and valve seats of internal combustion engines and the like.

The objects of the invention will more clearly appear from the following description of several forms of the device illustrated in the accompanying drawings.

In advance of the detailed description it may to advantage be stated that the improved device is of such character that it may be quickly applied between a valve and valve seat of an internal combustion engine without disassembling or removing the valve, but simply by lifting the same from its seat. The device includes a head that is adapted to be rotated, preferably by a small electric motor or the like, but may also be manually rotated or reciprocated. The head of the redressing tool is provided with a concavo-convex conical flange, to the inner and outer faces of which abrasive material such as emery or carborundum cloth is arranged to be secured. This concavo-convex conical flange gives form to both the inner and outer portions of the abrasive cloth or material, and hence, as an appropriate name this flange is herein frequently called a template or template flange. The said flange is of annular form but is provided with a lateral opening or gate passage, adapting the stem of the valve to pass therethrough when the device is positioned between the valve and its seat.

Various other important details in the construction and arrangement of the redressing tool are illustrated and will be particularly noted in the following description in connection with the drawings wherein like characters indicate like parts throughout the several views.

Referring to the drawings:

Fig. 1 is a perspective showing the tool in use as applied between the valve and valve seat of an internal combustion engine, a fragment only of the engine block being shown;

Fig. 2 is a perspective showing the head portion of the grinding or redressing tool, some parts being broken away;

Fig. 3 is a perspective showing the template-forming flange of the tool with emery cloth or the like applied to the under or outer surface thereof;

Fig. 4 is a perspective showing the emery cloth illustrated in Fig. 3 removed from the template;

Fig. 5 is a view corresponding to Fig. 3 but showing the emery cloth applied to the top or inner surface of the template flange;

Fig. 6 is a plan view showing the emery cloth of Fig. 5 removed from the flange;

Fig. 7 is an enlarged section taken on the line 7—7 of Fig. 1, some parts being broken away;

Fig. 8 is a view corresponding to Fig. 5 but showing a modified form of emery cloth;

Fig. 9 is a plan view of the emery cloth shown in Fig. 4 removed from the template flange;

Fig. 10 is a perspective showing a modified form of the head and flange of the redressing tool;

Fig. 11 is a fragmentary perspective showing the relatively fixed portion of the template flange of Fig. 10 with emery cloth applied to the upper surface thereof;

Fig. 12 is a view corresponding to Fig. 11 showing the emery cloth applied to the under surface of the template flange of Fig. 11;

Fig. 13 is a perspective illustrating a still further modified form of the head of the refacing tool, showing the head opened up for application or removal of the emery cloth;

Fig. 14 is a perspective showing the head of Fig. 13 closed up and locked for use;

Fig. 15 is a section taken on the line 15—15 of Fig. 14, some parts being shown in full; and Fig. 16 is a perspective of the emery cloth or abrasive sheet used in connection with the head illustrated in Figs. 13, 14 and 15.

What is at present believed to be the preferred form of the device is illustrated in Figs. 1 to 7 inclusive and will be first described.

In Figs. 1 and 7 the numeral 20 indicates that portion of the cylinder block of an internal combustion engine of the L type, the head thereof being removed. This offset portion 20 is the well known construction and is shown as provided with two valves (may of course have any desired number of valves) 21 normally engaging the customary conical valve seats 22 and having valve stems 23 mounted in the customary way and subject to coiled springs 24. These valves are of course mounted for vertical movements under time cams, the operation of which is well understood. It will also be assumed that these valves either by their springs or otherwise, while free for vertical movements, are held against rotation.

The head 25 of the grinder, as preferably designed, is a U-shaped structure having one short and one long leg or prong, the latter at its lower end being formed as part of or otherwise rigidly secured to the concavo-convex conical flange designated as the template 26. This template 26, at a place diametrically opposite from the lower end of the long arm of the head 25, has an opening 27 that affords a gateway that will pass the valve stem 23 when, as presently indicated, the device is applied in working position. At points diametrically opposite from each other and about 90° distant from the lower end of the long arm of the head 25, the template flange 26 has upstanding anchoring lugs or ears 28, the purpose of which will presently appear.

Intermediately pivoted to the short arm of the head 25 at 29 is a lock lever 30 which, at its normally lower end, has a finger lug 31, for a purpose that will presently appear.

For the application of power to rotate the grinder head, I have shown a small manually operated electric motor 32, the rotor of which, by a customary knuckle joint or the like not shown, is connected to a sleeve 33 equipped at its lower end with a chuck 43. The head 25 is provided with an axially projecting stem 35 adapted to be inserted into the sleeve 33 and to be clamped thereto by the chuck 34. By the means just described, the grinder head is adapted to be power rotated.

For application to the under or outer side of the template 26 there is provided a flexible sheet of abrasive material such as emery or carborundum cloth, best indicated in Figs. 3 and 4 by the numeral 36; and for application to the upper or inner surface of said template, there is provided a somewhat similar sheet 37 of the same or similar material. The sheet 36, in plan view, is approximately C-shaped and has upturned ends formed with perforations 38, through which the anchoring lugs 28 will be passed when the sheet 36 is placed against the bottom of the template. The upper sheet 37 is of somewhat similar form but has diametrically outstanding portions formed with slots 39 through which the anchoring lugs 28 are adapted to pass when the sheet 37 is placed on the upper concave surface of the template, as best shown in Fig. 5.

When only the sheet 36 is applied to the template, as shown in Fig. 3, the device will be adapted to grind or refinish only the valve seat; and when only the upper sheet 37 is applied to the template, as shown in Fig. 5, the device is then adapted to grind or refinish only the surface of the valve. When, however, both sheets are simultaneously applied to the template, the device is adapted to simultaneously refinish both the valve and valve seat surfaces under rotation of the head and the abrasive sheets carried thereby. Obviously different grades of fineness or coarseness of the abrasive sheets may be employed for the grinding or refinishing operations.

When the lever 30 is turned so that its flange 31 is upward, the lever will engage against or close to the upper surface of the abrasive cloth and thereby close the gateway 27 and also will serve as a counter-balance to the long arm of the head. Fig. 7 shows both of the abrasive sheets 36 and 37 applied to the template 26 for the simultaneous grinding of both valve and valve seat.

In Figs. 8 and 9 there is shown an abrasive sheet 40, differing in form from that illustrated in Fig. 6 in that the sheet is not provided with a central opening so that when the sheet is applied, as shown in Fig. 8, it would be adapted to grind a valve seat when the valve has been removed. This sheet 40 is provided with slots or openings 41 through which the lugs 28 are adapted to be passed.

In the modified structure illustrated in Figs. 10, 11 and 12 the grinder head 42, which has a stem 43, is provided with a fixed arm 44 and a hingedly connected stem 44'. The lower end of the long arm 44 is provided with an approximately semi-circular concavo-convex template connection 45 with upstanding lock lugs 46; and the hinged arm 44' is provided with a similar semi-circular concavo-convex template section 47 with upstanding lock lugs 48. A coil spring 49 anchored to the fixed arm 44 is adapted to be coupled to a loop 50 on the hinged arm 44' to hold the two template sections together.

For grinding the valve surface, a flexible abrasive sheet 51, which is of semi-circular form and which is adapted to be applied to the section 44', is provided with outstanding lugs having perforations 52 through which the lugs 46 are adapted to be passed. For grinding the valve seat, a somewhat similar abrasive sheet 53 is applied to the under surface of the section 47 and is provided with perforated ears 54 through which one of the lugs 48 and one end of the section 47 are adapted to be passed, as shown in Fig. 12. When these two sheets 51 and 53 are applied to the sections 45 and 47 and the device is closed, the device is then adapted for application between a valve and its seat.

In the modified structure illustrated in Figs. 13 to 16 inclusive, the body of the grinder head is in the form of a plate 55 having an axially projecting stem 56 and outstanding portions with passages 57. Hinged to the plate 55 at 58 is a concavo-convex template 59, formed with a gap at 60. The template 59 is provided with upstanding anchoring lugs 61. As shown in Figs. 14 and 15, the stem 56 is directly secured to angle brackets 62 that are rigidly secured on the top of the plate 55; and these lugs and the lower end of the stem are pivoted at 63 in alignment with perforations 64 in the lugs 61. A lock pin 65 is adapted to be passed through the perforations 63 and 64 to lock the template to the plate 55. The plate 55 is shown as provided with a depending flange 66 that will close the gap 60 when the template is locked to said plate 55.

In Fig. 16 there is shown in detail a flexible abrasive sheet adapted to be applied to the template, as best shown in Fig. 13. The body of this sheet, indicated at 67, is approximately C-shaped or U-shaped, and at its central portion has an under-turned portion 68 that is adapted to be placed against the under side of the template when the body of the plate is placed on the upper or concave side of the template. To permit this application and to lock the sheet for rotation with the template and the grinder head, the sheet is shown as provided with slots or perforations 69 through which the lugs 61 are adapted to be passed.

Operation

Directing attention again particularly to Figs. 1 to 7 inclusive and assuming that the gate 30 is opened, as shown in Fig. 2, it is evident that when the valve is raised against the tension of its spring, the template flange 26, with the applied abrasive sheet or sheets, may be quickly inserted between the valve seat and the raised valve. The gateway 27 obviously permits the valve stem to be passed therethrough, and the template flange properly positioned concentrically with the valve and seat. The tension of the valve spring 24 will press the valve against the upper abrasive sheet and will press the lower abrasive sheet against the valve seat so that when the grinder head is then revolved both the valve and the valve seat may be quickly redressed or ground to proper working conditions.

The ease with which the device may be applied, operated and removed without removing the valve from its working position, makes the operation of redressing or finishing valves or valve seats possible at low cost.

The manner of applying and operating the device, as illustrated in Figs. 10 to 16 inclusive, is quite similar to that just described in connection with the preferred form of the device. In either arrangement the grinder can be applied between the valve and its seat without removing the valve from its operating position in respect to the valve seat. The device illustrated in Figs. 10 to 12 inclusive will be closed between the valve and its seat simply by closing the hinged arm 44' in respect to the relatively fixed arm 44 in a manner that has already been noted.

In respect to the device illustrated in Figs. 13 to 16, the template with the attached abrasive sheet will be applied between the valve and seat while the device is opened up, as shown in Fig. 14, and the device will then be closed and put in operative condition by adjusting the parts, as shown in Figs. 14 and 15.

Several forms of the invention have been illustrated and described, but it will be understood that various other changes in details of construction and arrangement of parts may be made within the scope of the invention disclosed and claimed.

What I claim is:

1. The structure defined in claim 13 in which said template has upstanding anchoring lugs, and in combination with a sheet of flexible abrasive material applied to said template-forming flange and having perforations through which the anchoring lugs are passed.

2. In a device of the kind described, a rotary grinder head provided with an axially upwardly projecting stem and having a depending laterally offset arm, to the lower end of which arm is secured a concavo-convex annular template located with its axis coincident with the axis of said stem and provided at one side with a gap adapting it to pass a valve stem and to be inserted between the valve and its seat, and in which said template has anchoring lugs between its gap and supporting arm, and a flexible abrasive sheet applied to said template and having perforations through which said lugs are passed.

3. In a device of the kind described, a rotary grinder head provided with an axially upwardly projecting stem and having a depending laterally offset arm, to the lower end of which arm is secured a concavo-convex annular template located with its axis coincident with the axis of said stem and provided at one side with a gap adapting it to pass a valve stem and to be inserted between the valve and its seat, and in which said template has anchoring lugs between its gap and supporting arm, and a flexible abrasive sheet applied to said template and having perforations through which said lugs are passed, said abrasive sheet being applied both to the upper and lower faces of said template.

4. In a device of the kind described, a rotary grinder head provided with an axially upwardly projecting stem and having a depending laterally offset arm, to the lower end of which arm is secured a concavo-convex annular template located with its axis coincident with the axis of said stem and provided at one side with a gap adapting it to pass a valve stem and to be inserted between the valve and its seat, and in which the gap of said template is diametrically opposite to said supporting arm, said template having diametrically opposite upwardly projecting anchoring lugs located between the gap thereof and said supporting arm.

5. In a device of the kind described, a rotary grinder head provided with an axially upwardly projecting stem and having a depending laterally offset arm, to the lower end of which arm is secured a concavo-convex annular template located with its axis coincident with the axis of said stem and provided at one side with a gap adapting it to pass a valve stem and to be inserted between the valve and its seat, and in which said head is provided with a short arm opposite from said long arm and overlying but terminating short of the gap of said template.

6. In a device of the kind described, a rotary grinder head provided with an axially upwardly projecting stem and having a depending laterally offset arm, to the lower end of which arm is secured a concavo-convex annular template located with its axis coincident with the axis of said stem and provided at one side with a gap adapting it to pass a valve stem and to be inserted between the valve and its seat, and in which said head is provided with a short arm opposite from said long arm and overlying but terminating short of the gap of said template, and a lock lever intermediately pivoted to the lower end of said short arm and adapted to be turned in and out of alignment of the gap of said template.

7. In a device of the kind described, a rotary grinder head having laterally offset depending arms, one of which is relatively fixed and the other of which is hingedly connected, said arms at their lower ends having segmental concavo-convex conical templates, the one facing the other, and means for holding the same templates assembled.

8. In a device of the kind described, a rotary grinder head having laterally offset depending arms, one of which is relatively fixed and the other of which is hingedly connected, said arms at their lower ends having segmental concavo-convex conical templates, the one facing the other, and means for holding the same templates assembled, including a spring anchored to one of said arms and detachably connected to the other.

9. The structure defined in claim 7 in which said templates are provided with upstanding lock lugs.

10. In a device of the kind described, a stem having a rigidly secured plate, and an annular template hingedly connected at one side to one side of said head plate, said template at the side opposite to its hinge having a gap adapting it to pass a valve stem.

11. In a device of the kind described, a stem having a rigidly secured plate, and an annular template hingedly connected at one side to one side of said head plate, said template at the side opposite to its hinge having a gap adapting it to pass a valve stem, said template having upstanding perforated lugs, said plate having passages through which said lugs project when the template is closed against the head plate, and a lock pin insertable through said lock lugs to lock the said plate and template together, said template adapted to hold an abrasive sheet.

12. The structure defined in claim 11 in further combination with a flexible abrasive sheet seated against the upper face of said template and having a portion turned against the under surface of said template.

13. In a device of the kind described, a rotary grinder head provided with a substantially conical template that is an integral part that extends through so much more than 180° that it acts substantially as a complete cone, but is provided with a gap that extends through so much less than 180° that it will pass a valve stem and permit the template to be inserted between the valve and its seat, and then act as a substantially complete cone.

GUSTAV SOLBRIG.